US012561408B2

(12) United States Patent
Hong et al.

(10) Patent No.: US 12,561,408 B2
(45) Date of Patent: Feb. 24, 2026

(54) SERVER AND OPERATING METHOD THEREOF

(71) Applicant: LG ELECTRONICS INC., Seoul (KR)

(72) Inventors: Seungbum Hong, Seoul (KR); Juan Parc, Seoul (KR); Ikchan Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 18/598,828

(22) Filed: Mar. 7, 2024

(65) Prior Publication Data

US 2025/0005114 A1 Jan. 2, 2025

(30) Foreign Application Priority Data

Jun. 29, 2023 (KR) ......................... 10-2023-0084567

(51) Int. Cl.
*G06F 21/10* (2013.01)
(52) U.S. Cl.
CPC ...... *G06F 21/1062* (2023.08); *G06F 21/1063* (2023.08)
(58) Field of Classification Search
CPC ............. G06F 21/1062; G06F 21/1063; H04L 9/3239; H04L 9/3247; H04L 9/50; H04L 9/0891; H04L 9/0643
See application file for complete search history.

(56) References Cited

U.S. PATENT DOCUMENTS

| | | | |
|---|---|---|---|
| 2022/0358186 A1 * | 11/2022 | Deuel | ..................... G06Q 40/04 |
| 2023/0080927 A1 | 3/2023 | Padmanabhan | |
| 2024/0007284 A1 * | 1/2024 | Osborn | ................. G06F 16/164 |
| 2024/0070306 A1 * | 2/2024 | Jurat | ................... G06F 21/6218 |

OTHER PUBLICATIONS

How can I make an ERC721 NFT such that the token owner can edit an attribute in the metadata? Where can they edit the metadata. (Year: 2021).*
European Patent Office Application Serial No. 24164991.2, Search Report dated May 29, 2024, 7 pages.
Collins, "solidity—How can I make and ERC721 NFT such that the taken owner can edit an attribute in the metadata? Where can they edit the metadata?—Ethereum Stack Exchange," Jul. 7, 2021, 3 pages.
Korean Intellectual Property Office Application No. 10-2023-0084567, Office Action dated Dec. 20, 2025, 4 pages.
Alami, "Building a Tokenization Application Over Ethereum," Master Thesis, Universitat Politecnica de Catalunya, May 23, 2023, 41 pages.
Ethereum Stack Exchange, "How can I make an ERC721 NFT such that the token owner can edit an attribute in the metadata? Where can they edit the metadata?," Jul. 7, 2021, 4 pages.

* cited by examiner

*Primary Examiner* — Anh Nguyen
(74) *Attorney, Agent, or Firm* — LEE, HONG, DEGERMAN, KANG & WAIMEY

(57) ABSTRACT

A server according to an embodiment of the present disclosure can comprise: a communication interface configured to communicate with a user device or an update requesting device; and a controller configured to receive an update request for updating a dynamic non-fungible token (DNFT) from the update requesting device, determine whether the update requesting device has an authority for updating the DNFT, and update a metadata of the DNFT if it is determined that the update requesting device has the authority for updating the DNFT.

14 Claims, 7 Drawing Sheets

FIG. 3

SERVER AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2023-0084567, filed on Jun. 29, 2023, the contents of which is hereby incorporated by reference herein in its entirety.

TECHNICAL FIELD

This disclosure relates to managing metadata of NFT using blockchain technology.

BACKGROUND ART

A non-fungible token (NFT) is a virtual token that proves the owner of an asset using blockchain technology.

Metadata can be mapped to the NFT. Metadata can include one or more of the property of the asset, the address of the owner of the asset, and the price of the asset. Metadata can include overall information about an asset.

Currently, the content of metadata that NFT can express is limited.

While the meaning of NFT means an immutable token, if looking at recent use case, it can often see update of metadata that actually contain the value information of the NFT.

Existing NFT have limitations in updating reliable metadata, and there is a possibility of changing immutable data for malicious purpose.

DISCLOSURE

Technical Problem

An object of the present disclosure is to be able to manage and update Metadata differentially according to the nature of Metadata of dynamic NFT using blockchain technology.

The purpose of the present disclosure is to prevent the possibility of changing data for malicious purpose in advance by determining the presence or absence of authority if updating a dynamic NFT.

Technical Solution

A server according to an embodiment of the present disclosure can comprise: a communication interface configured to communicate with a user device or an update requesting device; and a controller configured to receive an update request for updating a dynamic non-fungible token (DNFT) from the update requesting device, determine whether the update requesting device has an authority for updating the DNFT, and update a metadata of the DNFT if it is determined that the update requesting device has the authority for updating the DNFT.

An operating method of a server according to an embodiment of the present disclosure can comprise: receiving an update request for updating a dynamic non-fungible token (DNFT) from an update requesting device; determining, by the device requesting update, whether the update requesting device has an authority for updating the DNFT; and updating a metadata of the DNFT if it is determined that the update requesting device has the authority for updating the DNFT.

Advantageous Effects

As a service supporting the extended standard for DNFT is provided according to an embodiment of the present disclosure, backward compatibility can be guaranteed.

In addition, according to an embodiment of the present disclosure, a metadata classification system is established according to importance for DNFT implementation, and reliability and integrity can be guaranteed through differential management of metadata.

In addition, if updating the dynamic NFT, it is updated according to the presence or absence of authority, so the possibility of malicious data change can be prevented.

DESCRIPTION OF DRAWINGS

FIG. 3 is a diagram illustrating a metadata classification scheme of an extended DNFT according to an embodiment of the present disclosure.

BEST MODE

Hereinafter, embodiments related to the present invention will be described in more detail with reference to the drawings. The suffixes "module" and "unit" for component used in the following description are given or used together in consideration of ease of writing the specification, and do not have meaning or role that are distinct from each other by themselves.

A user device according to an embodiment of the present invention is, for example, an intelligent user device in which a computer support function is added to a broadcast receiving function, and an Internet function is added while being faithful to the broadcast receiving function, such as a handwriting input device, a touch screen, and the like. Alternatively, a more user-friendly interface such as a space remote control can be provided. In addition, by being connected to the Internet and a computer by supporting a wired or wireless Internet function, functions such as e-mail, web browsing, banking, or game can be performed. A standardized universal OS can be used for these various functions.

Accordingly, since various applications can be freely added or deleted in the user device described in the present invention, for example, on a general-purpose OS kernel, various user-friendly functions can be performed.

More specifically, the user device can be, for example, a network TV, a smart TV, an LED TV, an OLED TV, and the like, and can also be applied to a smart phone.

Figure 1:
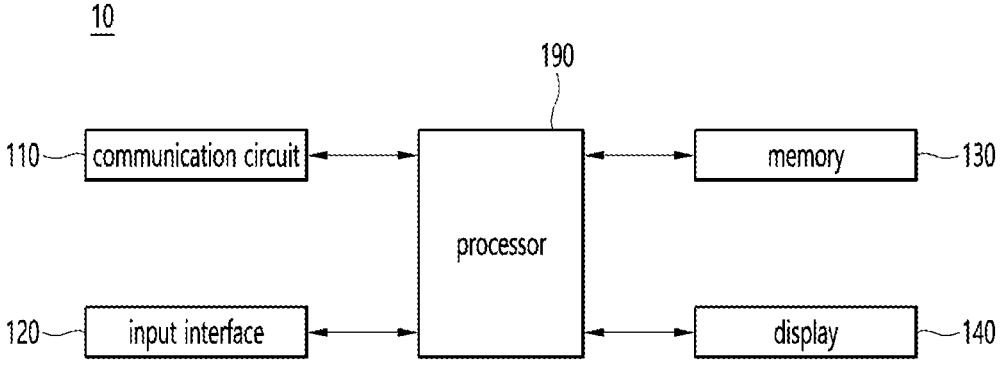
FIG. 1 is a block diagram illustrating a configuration of a user device according to an embodiment of the present disclosure.

FIG. 1 is a block diagram illustrating a configuration of a user device according to an embodiment of the present disclosure.

The user device 10 can be implemented as a fixed or movable device such as a projector, a mobile phone, a smart phone, a desktop computer, a laptop computer, a digital broadcast terminal, a personal digital assistant (PDA), a portable multimedia player (PMP), a navigation device, a tablet PC, a wearable device, a set-top box (STB), a DMB receiver, radio, desktop computer, or TV.

Referring to FIG. 1, a user device 10 can include a communication circuit 110, an input interface 120, a memory 130, a display 140 and a processor 190.

The communication circuit 110 can transmit/receive data with external devices such as other user device or server using wired/wireless communication technology.

The communication circuit 110 can perform communication using one communication standard among GSM (Global System for Mobile communication), CDMA (Code Division Multi Access), LTE (Long Term Evolution), 5G, WLAN (Wireless LAN), Wi-Fi (Wireless-Fidelity), Bluetooth (Bluetooth™), RFID (Radio Frequency Identification), Infrared Data Association (IrDA), ZigBee, and NFC (Near Field Communication).

The input interface 120 can include a camera for inputting a video signal, a microphone for receiving an audio signal, and a user input unit for receiving information from a user.

Here, a camera or microphone can be treated as a sensor, and signal obtained from the camera or microphone can be referred to as sensing data or sensor information.

The memory 130 can store various software and data related to the operation of the user device 10.

The display 140 can display an image signal received from the outside.

The processor 190 can control overall operation of the user device 10.

The processor 190 can generate a control signal for controlling the external device and transmit the generated control signal to the external device if linkage of the external device is required to perform the operation of the user device 10.

The processor 190 can control at least some of the components of the user device 10 in order to drive an application program stored in the memory 130.

The processor 190 can combine and operate two or more of the components included in the user device 10 to drive an application program.

Figure 2:
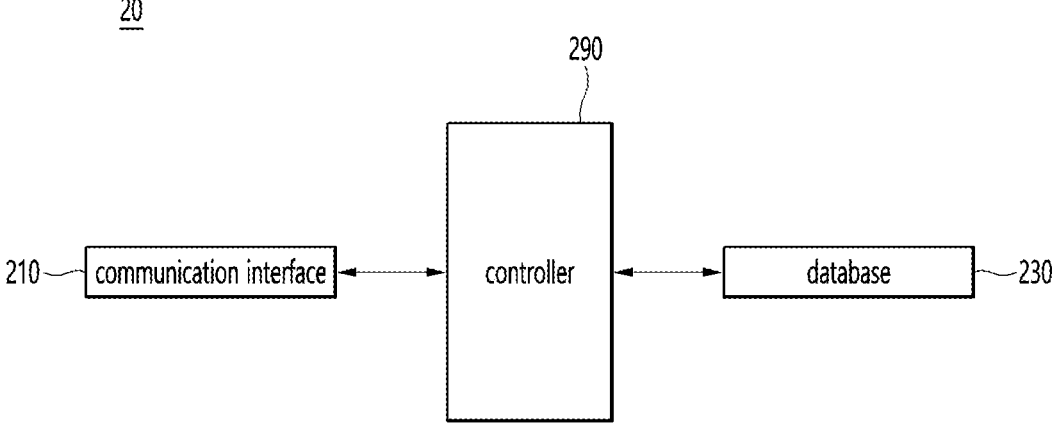
FIG. 2 is a block diagram for explaining the configuration of a management server according to an embodiment of the present disclosure.

FIG. 2 is a block diagram for explaining the configuration of a server according to an embodiment of the present disclosure.

Referring to FIG. 2, the management server 20 can include a communication interface 210, a database 230 and a controller 290.

The communication interface 210 can perform Internet communication with the user device 10 or the update request device 30.

The database 230 can store data received from the user device 10 or the update request device 30.

The communication interface 210 can include a communication circuit for Internet communication.

The controller 290 can control overall operations of the management server 20.

Figure 3:
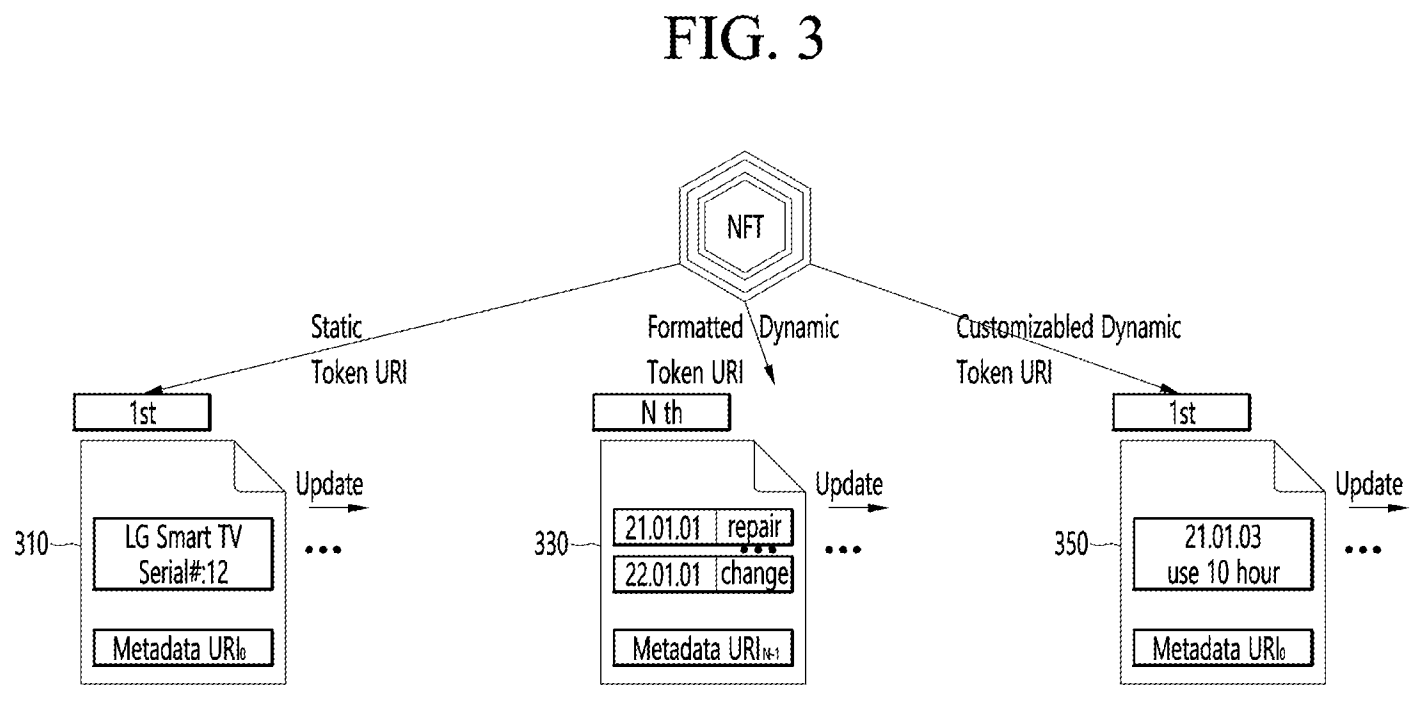

FIG. 3 is a diagram illustrating a Metadata classification scheme of an extended DNFT according to an embodiment of the present disclosure.

A non-fungible token (NFT) is a virtual token that proves the owner of an asset using blockchain technology.

Metadata can be mapped to the NFT. Metadata can include one or more of the property of the asset, the address of the owner of the asset, and the price of the asset. Metadata can include overall information about an asset.

NFT can be divided into static NFT and dynamic NFT.

A static NFT can be an NFT whose Metadata cannot be changed.

Dynamic NFT can be NFT whose metadata can change due to a change in the property or state of the asset.

When an NFT is created, after the Metadata describing the NFT is written, if the Metadata is stored in an external distributed file storage system called IPFS (Inter Planetary File System), a URI to access the resource is created. The metadata stored in IPFS is immutable, so reliability is ensured.

Dynamic NFT is a technology that changes and updates the properties of the NFT's metadata.

Existing static NFT follow ERC-721, the token standard used in the Ethereum blockchain. The ERC-721 specification is used to indicate ownership of token with unique identifier.

The ERC-721 standard consists of a token ID and a base URI (or Static Token URI).

The token ID is an identifier that identifies the NFT, and the base URI (Uniform Resource Identifier) can indicate the address where the metadata of the NFT is stored.

An embodiment of the present disclosure proposes an extension standard for DNFT.

That is, the extended specification for DNFT can include one or more of a Formatted Dynamic Token specification or a Customizable Dynamic Token specification.

The metadata type of the Formatted Dynamic Token specification can be the contract owner type.

The metadata type of the Customizable Dynamic Token specification can be the NFT owner type.

The extended standard for DNFT can be used to secure reliability by managing Metadata differentially according to the purpose of use of NFT or the change permission list of metadata, and to fundamentally block the possibility of metadata for malicious purposes.

Referring to FIG. 3, a first metadata 310 of a static NFT is shown.

The first metadata 310 can include a product (or asset) name, a manufacturing date of the product, a serial number of the product, and a Static Token URI indicating an address for accessing the first metadata 310.

The first metadata 310 can include information having property that are not changed.

The first metadata 310 can be static metadata conforming to the existing ERC-721 standard.

The second metadata 330 can be formatted dynamic metadata of DNFT that conforms to the formatted dynamic token standard.

When updating, the second Metadata 330 can include data requiring authentication according to a certain format. Here, authentication can require the contract owner's certification or the certification of an external organization pre-approved by the contract owner.

For example, when updating, the second metadata 330 can include data requiring authentication such as a degree, a license, a repair history, or a history of change of owner.

The second metadata 330 can include a formatted dynamic token URI indicating an address for accessing the second metadata 330.

The second metadata 330 can be contract owner based (or type) metadata.

The third metadata 350 can be customizable dynamic metadata of DNFT that conforms to the customizable dynamic token standard.

The third metadata 350 can be data that can be updated by a service provider of the update requesting device 30 or a user of the user device 10 registered (or approved) by the user in advance.

For example, the third metadata 350 can include information about product use history or product personal management history.

The third metadata 350 can be NFT owner-based (type) Metadata.

The second metadata 330 or the third metadata 350 can include static metadata that does not change like the first metadata 310.

The metadata type can include a contract owner type, a NFT owner type, and a static type.

The contract owner type can be a type including metadata that conforms to the formatted dynamic token standard. Metadata of the contract owner type can only be changed with the consent of the contract owner.

The contract owner can be the entity that issued the DNFT. A contract owner can be a manager of the management server 20.

The NFT owner type can be a type including metadata that conforms to the Customizable Dynamic Token specification. Metadata of the NFT owner type can only be changed with the approval of the NFT owner.

The NFT owner can be a user of the user device 10.

The static type can be a type including metadata conforming to the existing ERC-721 standard. The static type can be a Metadata type that cannot be changed.

Service that supports only existing ERC-721 only need to use static metadata.

As a service supporting the extended standard for DNFT is provided according to an embodiment of the present disclosure, backward compatibility can be guaranteed.

In addition, according to an embodiment of the present disclosure, a metadata classification system is established according to importance for DNFT implementation, and reliability and integrity can be guaranteed through differential management of Metadata.

Figure 4:
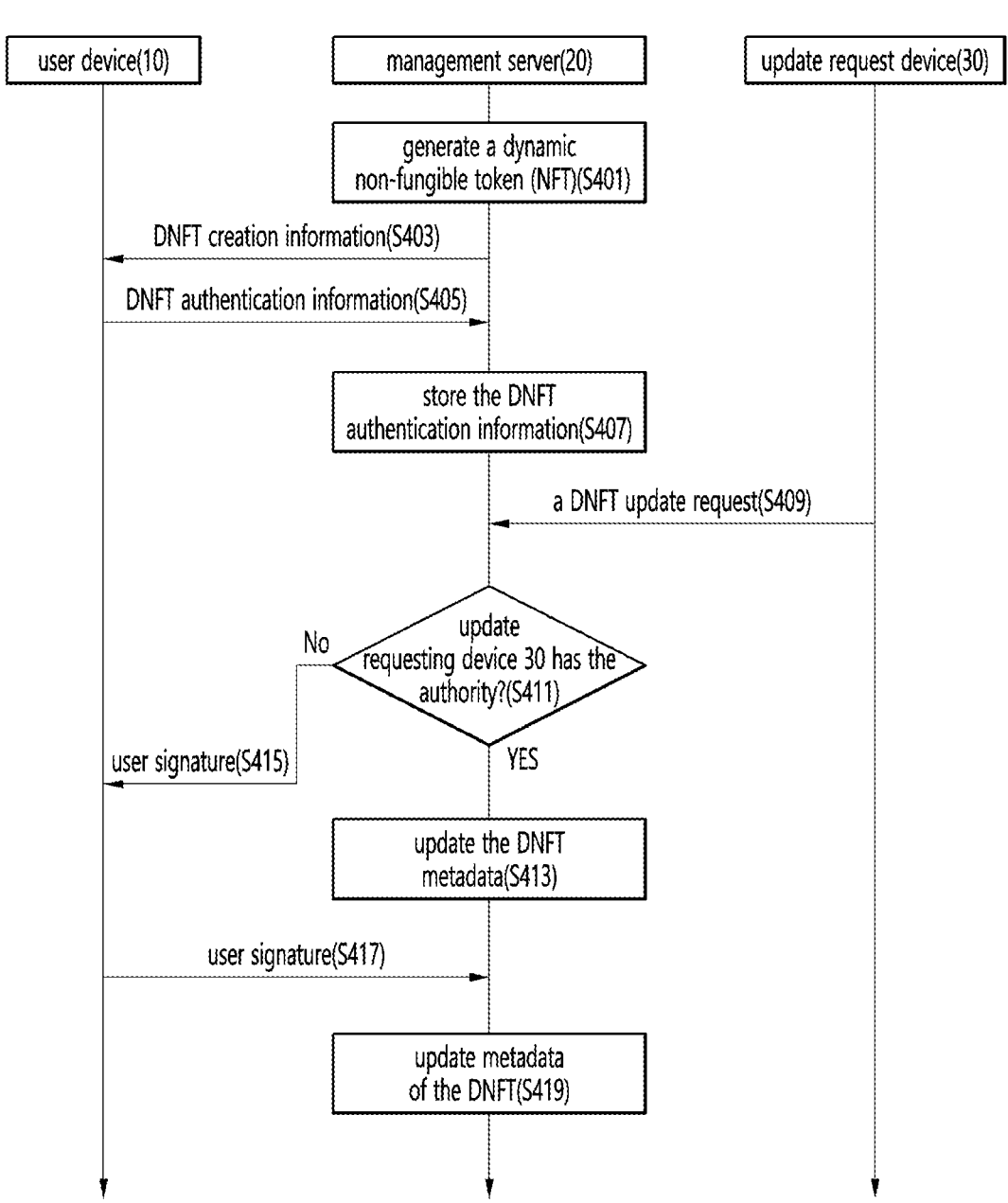
FIG. 4 is a ladder diagram for explaining a method of operating a system according to an embodiment of the present disclosure.

FIG. 4 is a ladder diagram for explaining a method of operating a system according to an embodiment of the present disclosure.

Referring to FIG. 4, a system according to an embodiment of the present disclosure can include a user device 10, a management server 20, and an update request device 30.

The user device 10 can be a device of a user who owns NFT or DNFT.

The management server 20 can be a server operated by an administrator who has distributed the DNFT contract. A DNFT contract can be a smart contract that implements DNFT function.

The administrator (or contract owner) of the management server 20 can write static metadata once for the first time. Contract owner can change dynamic metadata.

The update request device 30 can be a device for updating the meta information of the NFT. The update request device 30 can be a device operated by a private service center.

The update requesting device 30 can be a third party device trying to update the metadata of the DNFT.

The updater of the update requesting device 30 can modify the dynamic metadata and reflect the modified contents to the metadata after the DNFT owner confirms.

The updater of the update requesting device 30 can independently modify the dynamic metadata after receiving approval from the DNFT owner.

The user of the user device 10, the NFT owner, can inquire about item requested by the updater to be modified, and can determine whether or not to proceed with the update of metadata.

The NFT owner can modify the dynamic metadata independently, and can pre-register to a specific updater to update the dynamic metadata.

The DNFT contract can change the metadata URI. The DNFT contract can only change metadata URIs for valid metadata.

DNFT contract can set URI differently according to the type of metadata.

The controller 290 of the management server 20 can generate a dynamic non-fungible token (NFT) (S401).

In one embodiment, the controller 290 of the management server 20 can generate a DNFT according to a request of the user device 10.

In another embodiment, the controller 290 of the management server 20 can generate a DNFT for a user who has purchased a home appliance. In this case, the metadata of the DNFT can include information about the home appliance.

The controller 290 of the management server 20 can create a DNFT using a blockchain platform. The blockchain platform can be an ERC-based Ethereum platform, but this is only an example.

The controller 290 of the management server 20 can generate DNFT according to the smart contract of the black chain platform.

The controller 290 of the management server 20 can transmit DNFT creation information to the user device 10 through the communication interface 210 (S403).

The DNFT creation information can include one or more of a notification notifying the creation of a DNFT or metadata of the DNFT.

The processor 190 of the user device 10 can transmit DNFT authentication information in response to transmission of the DNFT creation information through the communication circuit 110 (S405).

The processor 190 can receive information on a change subject to change DNFT metadata according to a user command, and generate DNFT authentication information including the information on the received change subject.

Information on the change subject can include identification information representing the change subject. Identification information can be encrypted.

DNFT authentication information can include information on one or more change subjects.

User can set the authority to change DNFT metadata only with the signature (or authentication) of a specific update requesting device without their own signature.

At the time of generating the DNFT instead of steps S303 and S305, DNFT authentication information can be included in the metadata of the DNFT. That is, when a DNFT is generated according to a user request, DNFT authentication information can be included in metadata of the DNFT.

The controller 290 of the management server 20 can store the DNFT authentication information received from the user device 10 in the database 230 (S407).

The controller 290 of the management server 20 can match the DNFT authentication information with the DNFT and store it in the database 230.

DNFT authentication information can include information about a subject having authority to change DNFT metadata.

The controller 290 of the management server 20 can receive a DNFT update request for updating DNFT metadata from the update requesting device 30 (S409).

The DNFT update request can be a request for changing DNFT metadata.

The DNFT update request can include information of metadata to be changed. That is, the DNFT update request can include information for updating metadata.

In response to the DNFT update request, the controller 290 of the management server 20 can determine whether the update requesting device 30 has the authority to update DNFT metadata (S411).

The controller 290 of the management server 20 can determine whether the update requesting device 30 has authority to update the metadata of the DNFT based on the DNFT authentication information matched with the DNFT stored in the database 230.

The controller 290 of the management server 20 can determine whether identification information of the update requesting device 30 is included in the DNFT authentication information.

If the DNFT authentication information includes the identification information of the update requesting device 30, the controller 290 of the management server 20 can determine that the update requesting device 30 has the authority to update the metadata of the DNFT.

If the DNFT authentication information does not include the identification information of the update requesting device 30 in the DNFT authentication information, the controller 290 of the management server 20 can determine that the update requesting device 30 does not have authority to update the DNFT metadata.

If the controller 290 of the management server 20 determines that the update requesting device 30 has authority to update the DNFT metadata, can update the DNFT metadata according to the update information included in the DNFT update request (S413).

The controller 290 of the management server 20 can automatically update the DNFT metadata according to the smart contract of the black chain platform if it is determined that the update requesting device 30 has the authority to update the DNFT metadata.

The controller 290 of the management server 20 can request a signature from the user device 10 if it is determined that the update requesting device 30 does not have the authority to update the metadata of the DNFT (S415).

In one embodiment, the signature can be a transaction that approves the change of metadata of the DNFT.

The controller 290 of the management server 20 can receive a signature from the user device 10 (S417) and can update metadata of the DNFT according to the received signature (S419).

Multi-signature is an electronic signature method that prevents forgery/falsification of data, checks message integrity, and performs authentication.

However, if multi-signatures are required every time for frequent metadata update, there is inconvenience in that the user has to sign one by one.

According to an embodiment of the present disclosure, a user can pre-register a trusted authority (update request device) through authentication information. Accordingly, if the user's DNFT is updated by the corresponding institution, the DNFT can be updated only with the signature of the corresponding institution even if the user does not sign, and thus convenience can be improved.

Meanwhile, in the DNFT standard of FIG. 4, any one or more of a formatted dynamic token standard or a customizable dynamic token standard can be applied as an extension standard for the DNFT.

Figure 5:
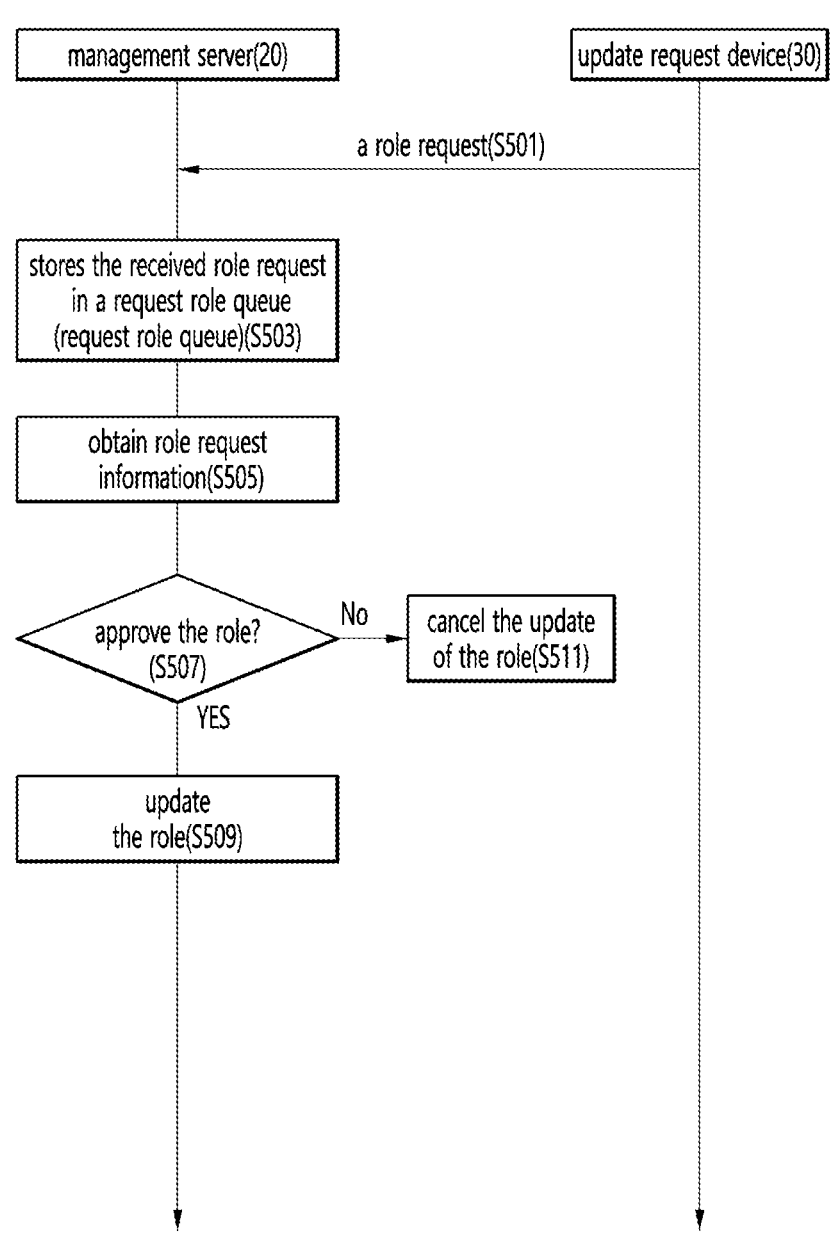
FIG. 5 is a ladder diagram illustrating a system role management method according to another embodiment of the present disclosure.

FIG. 5 is a ladder diagram illustrating a system role management method according to another embodiment of the present disclosure.

Referring to FIG. 5, the controller 290 of the management server 20 can receive a role request from the update request device 30 (S501).

The role request can be a request that the update requesting device 30 grant authority to update the contract owner-based metadata alone without the contract owner's signature.

The controller 290 of the management server 20 stores the received role request in a request role queue (request role queue) (S503) and obtains role request information (S505).

The role request information can include a list to which the update requesting device 30 has requested permission. The list can contain one or more attributes of contract owner-based metadata.

If the controller 290 of the management server 20 approves the role of the update request device 30 for the role request information (S507), the controller 290 can update the role of the update request device 30 (S509).

If the controller 290 of the management server 20 does not approve the role of the update requesting device 30 for the role request information (S507), the controller 290 can cancel the update of the role of the update requesting device 30 (S511).

Figure 6:
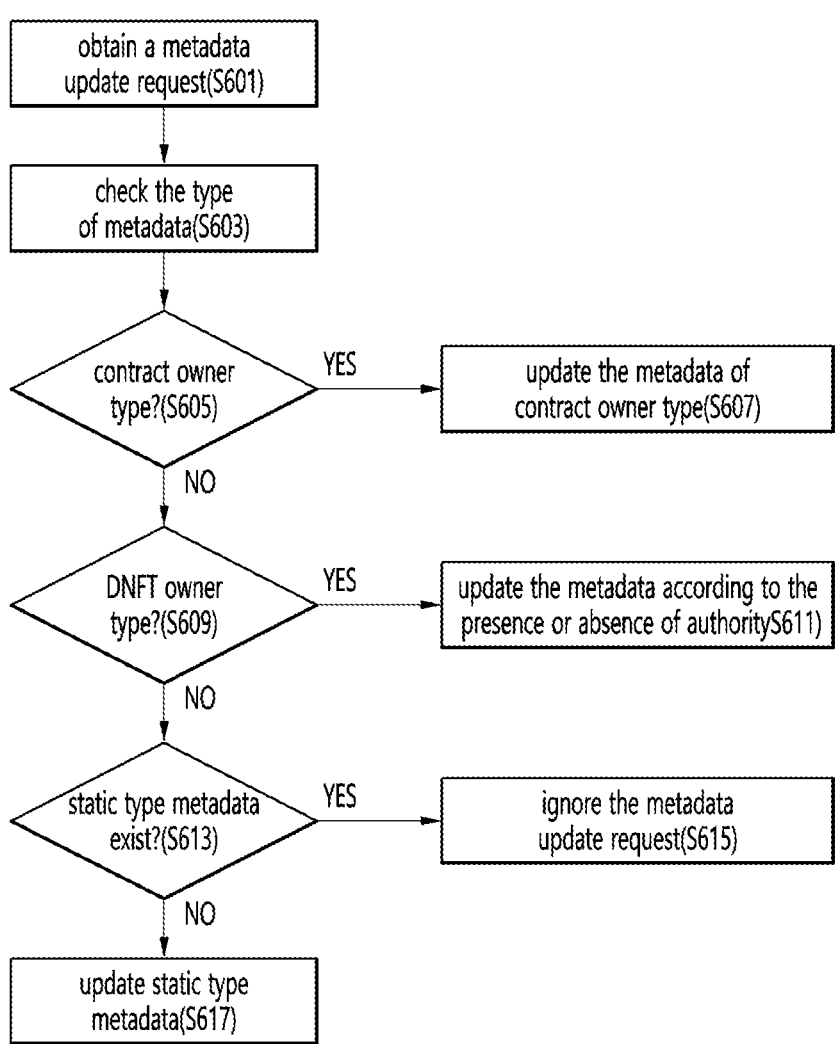
FIG. 6 is a ladder diagram illustrating a method of updating metadata of a management server if a metadata update request is received by a contract owner.

FIG. 6 is a ladder diagram illustrating a method of updating metadata of a management server if a metadata update request is received by a contract owner.

The controller 290 of the management server 20 can obtain a metadata update request (S601).

The controller 290 can check the type of metadata included in the metadata update request (S603).

The controller 290 can update the metadata (S607) if the confirmed metadata type is the contract owner type (S605).

If the checked metadata type is the DNFT owner type (S609), the controller 290 can update the metadata of the NFT owner type according to the presence or absence of modification authority (S611).

If the checked metadata type is not the DNFT owner type, the controller 290 determines whether static type metadata exists (S613).

The controller 290 ignores the metadata update request if static type metadata exists (S615).

If the static type metadata does not exist, the controller 290 updates static type metadata (S617).

Figure 7:
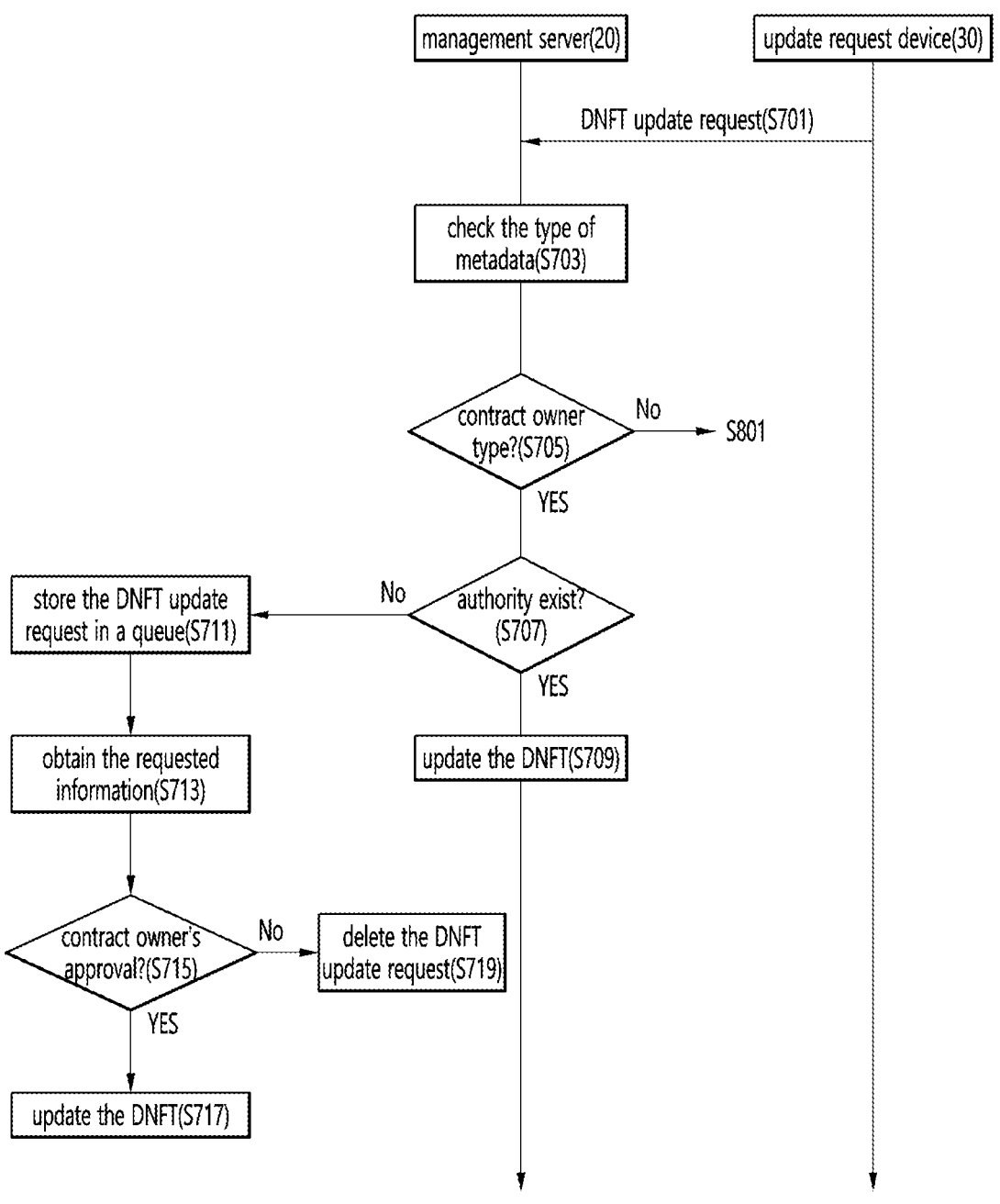
FIGS. 7 and 8 are ladder diagrams illustrating a method of updating metadata of a management server if a metadata update request is received from an update requesting device.
Figure 8:
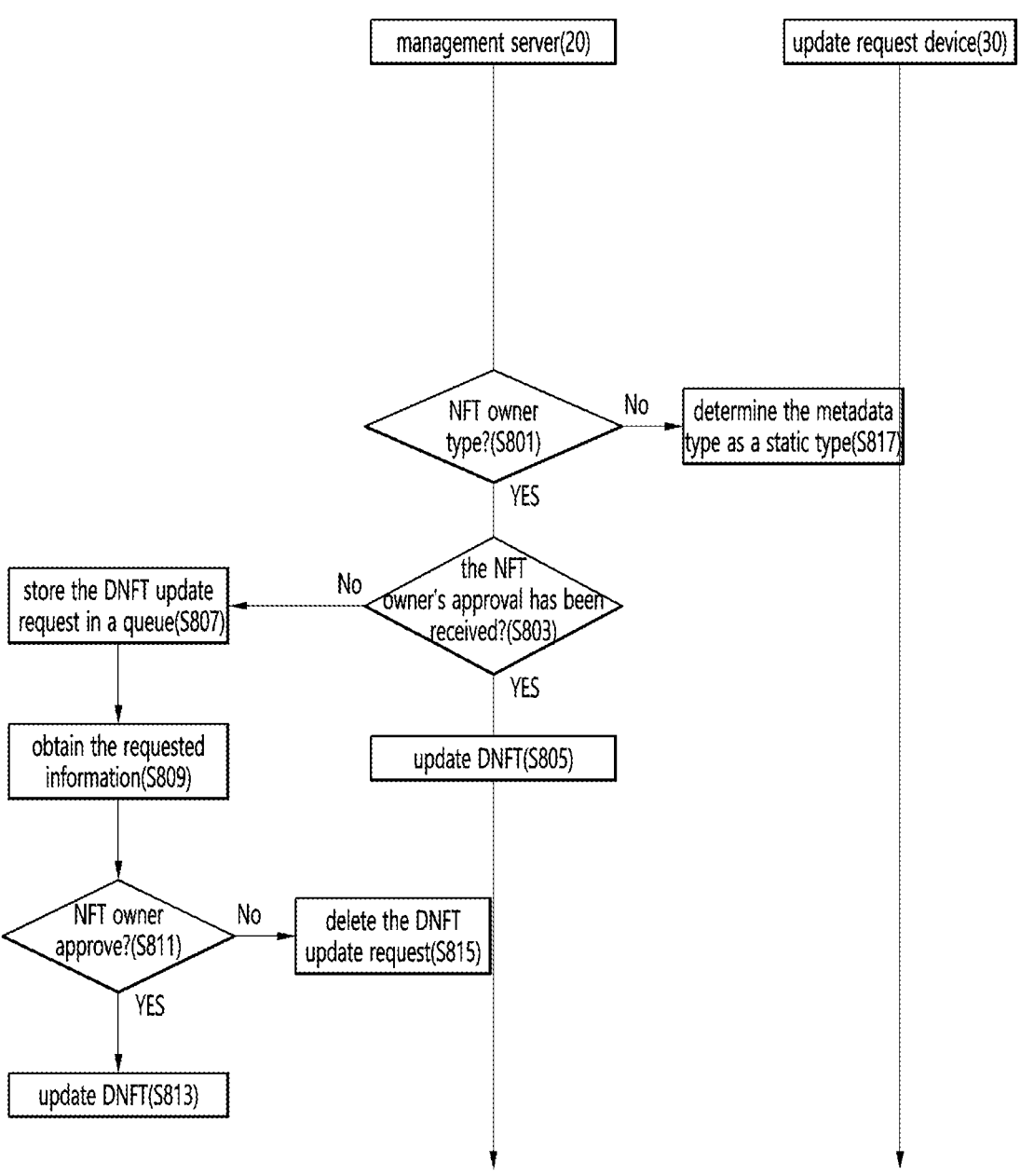

FIGS. 7 and 8 are ladder diagrams illustrating a method of updating metadata of a management server if a metadata update request is received from an update requesting device.

FIGS. 7 and 8 are diagrams in which steps S409 and subsequent steps of FIG. 3 are embodied.

The controller 290 of the management server 20 can receive a DNFT update request from the update request device 30 (S701).

The controller 290 can check the type of metadata included in the DNFT update request (S703).

The DNFT update request can include the type of metadata and contents to be changed of the metadata.

The metadata type can include a contract owner type, an NFT owner type, and a static type.

The contract owner type can be a type including metadata that conforms to the formatted dynamic token standard.

The NFT owner type can be a type including metadata that conforms to the Customizable Dynamic Token standard.

The static type can be a type including metadata conforming to the existing ERC-721 standard.

If the checked metadata type is the contract owner type (S705), the controller 290 can determine whether the update requesting device 30 has authority to update the metadata of the DNFT (S707).

The controller 290 can determine whether the update requesting device 20 has a role to change metadata of the contract owner type.

The controller 290 can determine whether the updater requesting device 30 has a role to change metadata of the contract owner type through the embodiment of FIG. 5.

If it is determined that the update requesting device 30 has the right to update the DNFT metadata, the controller 290 can update the DNFT metadata according to the update information included in the DNFT update request (S709).

The controller 290 can directly update the metadata of the DNFT.

The controller 290 can transmit a message permitting DNFT update to the update requesting device 30, and the update requesting device 30 can change DNFT metadata according to the received message.

The controller 290 can store the DNFT update request in a queue if it is determined that the update requesting device 30 does not have the authority to update the DNFT metadata (S711).

The controller 290 obtains the requested information (S713), and upon receiving the contract owner's approval (S715), can update the DNFT metadata according to the update information included in the DNFT update request (S717).

If the controller 290 does not receive the contract owner's approval (S715), the controller 290 can delete the DNFT update request stored in the queue (S719).

If the checked metadata type is not the contract owner type (S705), the controller 290 can determine whether the metadata type is the NFT owner type (S801), as shown in FIG. 8.

If the metadata type is the NFT owner type, the controller 290 can determine whether the NFT owner's approval has been received (S803).

If the metadata type is the NFT owner type, the controller 290 can request a user signature from the user device 10.

If a user signature is received from the user device 10, the controller 290 can determine that the NFT owner's approval has been received.

In another example, the controller 290 can determine that the NFT owner's approval has been received if the update request device 30 is a previously registered device capable of modifying NFT owner type metadata by the user device 10.

If the approval is received from the NFT owner, the controller 290 can update metadata of the DNFT according to the update information included in the DNFT update request (S805).

If the controller 290 does not receive approval from the NFT owner, the controller 290 can store the DNFT update request in a queue (S807).

If the controller 290 obtains the requested information (S809) and receives approval from the NFT owner (S811), the controller 290 can update the metadata of the DNFT according to the update information included in the DNFT update request (S813).

The controller 290 can delete the DNFT update request stored in the queue if the NFT owner's approval is not received (S815).

If the metadata type is not the NFT owner type, the controller 290 determines the metadata type as a static type (S817).

The controller 290 can ignore the DNFT update request if the static type exists in the corresponding DNFT.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The configuration and method of the above-described embodiments are not limitedly applicable to the user device described above, but the above embodiments can be configured by selectively combining all or part of each embodiment so that various modifications can be made.

What is claimed is:

1. A server comprising:
a communication circuit configured to communicate with a user device associated with a dynamic non-fungible token (DNFT) owner or an update requesting device that is different from the user device; and
a controller configured to:
receive, via the communication circuit, an update request for updating a metadata of a DNFT from the update requesting device;
identify a type of the metadata of the DNFT included in the update request,
wherein the type of the metadata of the DNFT is any one of a static type that follows an ERC-721 standard, a contract owner type that requires approval from a contract owner prior to the updating of the metadata of the DNFT, or a DNFT owner type that requires a user signature from a DNFT owner of the user device prior to the updating of the metadata of the DNFT,
wherein if the type of the metadata is identified to be the static type, the update request is ignored, and if the type of the metadata is identified to be the DNFT owner type, determine whether the update requesting device has an authority for the updating of the metadata of the DNFT.

2. The server of claim 1, wherein the controller is further configured to:
determine that the update requesting device has the authority for the updating of the metadata of the DNFT based on any of:
i) the type of the metadata of the DNFT included in the update request being the DNFT owner type and the update requesting device being a device pre-registered with the user device; or
ii) the type of the metadata of the DNFT included in the update request being the DNFT owner type and the user signature having been received by the server, from the user device; and
update the metadata of the DNFT based on the determine that the update requesting device has the authority for the updating of the metadata of the DNFT.

3. The server of claim 2, wherein,
the static type is a type in which the metadata of the DNFT includes an attribute that does not change,
the contract owner type is a type in which the metadata of the DNFT is able to be changed and authentication of the contract owner is required prior to the updating of the metadata of the DNFT, and the DNFT owner type is a type in which the metadata of the DNFT is able to be changed and the update of the metadata of the DNFT is able to be performed by the user device and by the update requesting device that had been pre-registered in advance with the user device.

4. The server of claim 3, wherein the controller is further configured to:

determine that the update requesting device has the authority for the updating of the metadata of the DNFT, based on the type of the metadata of the DNFT included in the update request being the contract owner type and there is approval by the contract owner.

5. The server of claim 1, wherein the controller is further configured to issue the DNFT through a smart contract of a blockchain platform.

6. A method for operating a server, comprising:

receiving, over a communication circuit, an update request for updating a metadata of a dynamic non-fungible token (DNFT) from an update requesting device;

identifying a type of the metadata of the DNFT included in the update request, wherein the type of the metadata of the DNFT is any one of a static type that follows an ERC-721 standard, a contract owner type that requires approval from a contract owner prior to the updating of the metadata of the DNFT, or a DNFT owner type that requires a user signature from a DNFT owner of a user device prior to the updating of the metadata of the DNFT, wherein if the type of the metadata is identified to be the static type, the update request is ignored, and if the type of the metadata is identified to be the DNFT owner type, determine whether the update requesting device has an authority for the updating of the metadata of the DNFT.

7. The method of claim 6, further comprising:

determining that the update requesting device has the authority for the updating of the metadata of the DNFT based on any of:

i) the type of the metadata of the DNFT included in the update request being the DNFT owner type and the update requesting device being a device pre-registered with the user device; or ii) the type of the metadata of the DNFT included in the update request being the DNFT owner type and the user signature having been received by the server, from the user device; and updating the metadata of the DNFT based on the determining that the update requesting device has the authority for the updating of the metadata of the DNFT.

8. The method of claim 7, wherein the static type is a type in which the metadata of the DNFT includes an attribute that does not change, the contract owner type is a type in which the metadata of the DNFT is able to be changed and authentication of the contract owner is required prior to the updating of the metadata of the DNFT, and the DNFT owner type is a type in which the metadata of the DNFT is able to be changed and the updating of the metadata of the DNFT is able to be performed by the user device and by the update requesting device that had been pre-registered in advance with the user device.

9. The method of claim 8, the wherein the determining that the update requesting device has the authority for the updating of the metadata of the DNFT comprises:

determining that the update requesting device has the authority for the updating of the metadata of the DNFT, based on the type of the metadata of the DNFT included in the update request being the contract owner type and there is approval by the contract owner.

10. The method of claim 6, further comprising:

issuing the DNFT through a smart contract of a blockchain platform.

11. A server comprising:

a communication circuit configured to communicate with a user device associated with a dynamic non-fungible token (DNFT) owner or an update requesting device that is different from the user device;

a storage medium comprising processor-readable code; and a processor operating according to the code to:

receive, via the communication circuit, an update request for updating a metadata of a DNFT from the update requesting device;

identify a type of the metadata of the DNFT included in the update request, wherein the type of the metadata of the DNFT is any one of a static type that follows an ERC-721 standard, a contract owner type that requires approval from a contract owner prior to the updating of the metadata of the DNFT, or a DNFT owner type that requires a user signature from a DNFT owner of the user device prior to the updating of the metadata of the DNFT, wherein if the type of the metadata is identified to be the static type, the update request is ignored, and if the type of the metadata is identified to be the DNFT owner type, determine whether the update requesting device has an authority for the updating of the metadata of the DNFT.

12. The server of claim 11, wherein the processor further operates according to the code to:

determine that the update requesting device has the authority for the updating of the metadata of the DNFT based on any of:

i) the type of the metadata of the DNFT included in the update request being the DNFT owner type and the update requesting device being a device pre-registered with the user device; or ii) the type of the metadata of the DNFT included in the update request being the DNFT owner type and the user signature having been received by the server, from the user device; and update the metadata of the DNFT based on the determine that the update requesting device has the authority for the updating of the metadata of the DNFT.

13. The server of claim 12, wherein, the static type is a type in which the metadata of the DNFT includes an attribute that does not change, the contract owner type is a type in which the metadata of the DNFT is able to be changed and authentication of the contract owner is required prior to the updating of the metadata of the DNFT, and the DNFT owner type is a type in which the metadata of the DNFT is able to be changed and the updating of the metadata of the DNFT is able to be performed by the user device and by the update requesting device that had been pre-registered in advance with the user device.

14. The server of claim 13, wherein the processor further operates according to the code to:

determine that the update requesting device has the authority for the updating of the metadata of the DNFT, based on the type of the metadata of the DNFT included in the update request being the contract owner type and there is approval by the contract owner.

* * * * *